United States Patent
Cao et al.

(10) Patent No.: US 12,355,689 B2
(45) Date of Patent: Jul. 8, 2025

(54) DEVICE, SYSTEM, AND METHOD FOR POWER SPECTRUM DENSITY (PSD) LIMITED TRANSMISSIONS

(71) Applicant: NXP USA, Inc., Austin, TX (US)

(72) Inventors: Rui Cao, Sunnyvale, CA (US); Yan Zhang, Palo Alto, CA (US); Dong Wei, Austin, TX (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 642 days.

(21) Appl. No.: 17/752,763

(22) Filed: May 24, 2022

(65) Prior Publication Data

US 2022/0407644 A1     Dec. 22, 2022

Related U.S. Application Data

(60) Provisional application No. 63/214,947, filed on Jun. 25, 2021, provisional application No. 63/213,267, filed on Jun. 22, 2021.

(51) Int. Cl.
| | | |
|---|---|---|
| *H04L 5/00* | (2006.01) | |
| *H04B 1/69* | (2011.01) | |
| *H04L 27/26* | (2006.01) | |
| *H04W 80/02* | (2009.01) | |

(52) U.S. Cl.
CPC ............ *H04L 5/0044* (2013.01); *H04B 1/69* (2013.01); *H04L 5/0007* (2013.01); *H04L 27/2602* (2013.01); *H04W 80/02* (2013.01)

(58) Field of Classification Search
CPC . H04L 5/0044; H04L 5/0007; H04L 27/2602; H04B 1/69; H04W 80/02
See application file for complete search history.

(56) References Cited

U.S. PATENT DOCUMENTS

| | | |
|---|---|---|
| 9,942,008 B1 | 4/2018 | Sun et al. |
| 10,616,017 B2 | 4/2020 | Liu et al. |
| 2021/0391961 A1 | 12/2021 | Cao et al. |
| 2021/0392661 A1 | 12/2021 | Cao et al. |

OTHER PUBLICATIONS

IEEE, P802.11-Revme/D1.0, "Part 11: Wireless LAN Medium Access Control (MAC) and Physical Layer (PHY) Specifications", section 27.3.11-27.3.11.10; Preamble and section 27.3.12.9-27.3.12.16; DCM, Dec. 2021, 170 pgs.
IEEE, 802.11be D1.0, "Part 11: Wireless LAN Medium Access Control (MAC) and Physical Layer (PHY) Specifications Amendment 8: Enhancements for extremely high throughput (EHT)", Section 36.3.13.10 Frequency domain duplication, Dec. 2021, 23 pgs.

*Primary Examiner* — Natasha W Cosme

(57) ABSTRACT

A device, a system, and a method for power spectrum density (PSD) limited transmissions are disclosed. In an embodiment, the device includes a wireless network interface device implemented on one or more integrated circuits (ICs), where the wireless network interface device is configured to generate a Physical Layer Convergence Procedure (PLCP) Protocol Data Unit (PPDU) that includes a base modulation frequency unit, where the base modulation frequency unit is duplicated to unpunctured subchannels of the PPDU with a phase rotation, and transmit the PPDU in accordance with a power spectrum density (PSD) limit.

20 Claims, 12 Drawing Sheets

DEVICE, SYSTEM, AND METHOD FOR POWER SPECTRUM DENSITY (PSD) LIMITED TRANSMISSIONS

CROSS-REFERENCE TO RELATED APPLICATIONS

This application is entitled to the benefit of U.S. Provisional Patent Application Ser. No. 63/213,267, filed on Jun. 22, 2021, and U.S. Provisional Patent Application Ser. No. 63/214,947, filed on Jun. 25, 2021, each of which is incorporated by reference herein.

BACKGROUND

In wireless communications, wireless devices, e.g., multi-link devices (MLDs), can execute various multi-link operations, such as transmission and reception of frames via one or more communication links. As an example, a wireless device may transmit and receive Physical Layer Convergence Procedure (PLCP) Protocol Data Units (PPDUs) with another wireless device on one or more links to exchange information and data. When a PPDU is transmitted in accordance with a power spectrum density (PSD) limit and with a next-generation communication protocol, the PPDU may include punctured subchannels. However, conventional PPDU designs and encoding techniques may not account for the punctured subchannels. As such, the PPDU may have a restricted transmission range and/or a restricted data rate which may cause wireless communications to be inefficient.

SUMMARY

A device, a system, and a method for power spectrum density (PSD) limited transmissions are disclosed. In an embodiment, the device includes a wireless network interface device implemented on one or more integrated circuits (ICs), where the wireless network interface device is configured to generate a Physical Layer Convergence Procedure (PLCP) Protocol Data Unit (PPDU) that includes a base modulation frequency unit, where the base modulation frequency unit is duplicated to unpunctured subchannels of the PPDU with a phase rotation, and transmit the PPDU in accordance with a power spectrum density (PSD) limit.

In an embodiment, the PPDU is a non-orthogonal frequency-division multiple access (non-OFDMA) PPDU, and data is modulated on a basic bandwidth and duplicated across a signal bandwidth, and at least one of a per-basic bandwidth polarity change and a per-tone phase rotation is applied to the data.

In an embodiment, the phase rotation is defined by:

$$d'_{k+i*N_{SD}/2} = d'_k * e^{j\theta_{i,k}}$$

where d' represents modulated data, k represents a subcarrier of the base modulation frequency unit, i represents an index of the base modulation frequency unit, $N_{SD}$ represents a number of subcarriers included in the base modulation frequency unit, and j represents an imaginary unit that has a property of $j^2=-1$.

In an embodiment, the phase rotation is a per-unit phase rotation that uses one phase rotation defined for the base modulation frequency unit.

In an embodiment, the base modulation frequency unit is 20 megahertz (MHz), and the one phase rotation is a per-20 MHz phase rotation that uses a gamma rotation defined for a preamble portion of the PPDU.

In an embodiment, a signal bandwidth of the PPDU is 80 MHz with a punctured 20 MHz subchannel, and where the base modulation frequency unit and duplication scheme is at least one of 242 Resource Unit (RU) modulated via Modulation and Coding Scheme (MCS) 0 (MCS0) and tri-sub-carrier modulation (TCM), and 242 RU modulated via MCS0 and 484 RU modulated with dual-subcarrier modulation (DCM).

In an embodiment, a signal bandwidth of the PPDU is 80 MHz, and where the base modulation frequency unit and duplication scheme is at least one of 242 RU modulated via MCS0-DCM with four duplicates, and 106 distributed RU (dRU) modulated via MCS0.

In an embodiment, a signal bandwidth of the PPDU is 160 MHz with at least one punctured 20 MHz subchannel, and where the base modulation frequency unit and duplication scheme is at least one of 242 RU modulated via MCS0 with N duplicates, where N=6 for a 120 MHz bandwidth and N=7 for a 140 MHz bandwidth, 484+242 RU modulated via MCS0 with two duplicates for the 120 MHz bandwidth, and 484 RU modulated via MCS0 with three duplicates for the 120 MHz bandwidth.

In an embodiment, a signal bandwidth of the PPDU is 160 MHz, and where the base modulation frequency unit and duplication scheme is at least one of 242 RU modulated via MCS0 with eight duplicates, 484 RU modulated via MCS0-DCM with four duplicates, 242 RU distributed over 160 MHz and modulated via MCS0, and 242 RU distributed over 80 MHz and duplicated to another 80 MHz.

In an embodiment, a signal bandwidth of the PPDU is 320 MHz with at least one punctured 20 MHz subchannel, and where the base modulation frequency unit and duplication scheme is at least one of 242 RU modulated via MCS0 with N duplicates, where N=10 for a 200 MHz bandwidth, N=12 for a 240 MHz bandwidth, and N=14 for a 280 MHz bandwidth, 484 RU modulated via MCS0 with N duplicates, where N=5 for the 200 MHz bandwidth, N=6 for the 240 MHz bandwidth, and N=7 for the 280 MHz bandwidth, and 996 RU modulated via MCS0 with three duplicates for the 240 MHz bandwidth.

In an embodiment, a signal bandwidth of the PPDU is 320 MHz, and where the base modulation frequency unit and duplication scheme is at least one of 484 RU modulated via MCS0 with eight duplicates, 996 RU modulated via MCS0-DCM with four duplicates, and 484 RU distributed over 320 MHz and modulated via MCS0.

In an embodiment, the PPDU is transmitted via a punctured Extremely High Throughput (EHT) orthogonal frequency-division multiple access (OFDMA) transmission using dRU for extended range (ER), and where an RU is distributed over a predefined punctured spreading bandwidth within the base modulation frequency unit.

In an embodiment, the PPDU is transmitted via a punctured EHT OFDMA transmission using dRU for ER, and where an RU is distributed over a predefined contiguous spreading bandwidth within the base modulation frequency unit.

In an embodiment, the PPDU is transmitted via a punctured EHT OFDMA transmission using dRU for ER, and where an RU is distributed over a predefined base spreading frequency unit.

In an embodiment, a 20 MHz EHT ER preamble is duplicated across unpunctured 20 MHz subchannels of the PPDU.

In an embodiment, where the base modulation frequency unit of the PPDU is one eighth (⅛) of a signal bandwidth with eight duplicates.

In an embodiment, the base modulation frequency unit of the PPDU is one fourth (¼) of a signal bandwidth with DCM and with four duplicates.

In an embodiment, a dRU is spread within one eighth (⅛) of a PPDU bandwidth, and where the dRU is duplicated across the PPDU bandwidth.

A system for PSD limited transmissions is also disclosed. In an embodiment, the system includes a first wireless device, where the first wireless device includes a wireless network interface device implemented on one or more ICs, and where the wireless network interface device is configured to generate a PPDU that includes a base modulation frequency unit, where the base modulation frequency unit is duplicated to unpunctured subchannels of the PPDU with a phase rotation, transmit the PPDU in accordance with a PSD limit, and a second wireless device, where the second wireless device includes another wireless network interface device implemented on one or more other ICs, and where the other wireless network interface device is configured to receive the PPDU in accordance with the PSD limit.

A method for PSD limited transmissions is also disclosed. In an embodiment, the method includes generating, by a wireless device, a PPDU that includes a base modulation frequency unit, where the base modulation frequency unit is duplicated to unpunctured subchannels of the PPDU with a phase rotation, and transmitting, by the wireless device, the PPDU in accordance with a PSD limit.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4C depicts another example of a PPDU with a signal bandwidth of 80 MHz that may be transmitted by a wireless device in accordance with a PSD limit.

FIG. 5 depicts an example of a PPDU with a signal bandwidth of 160 MHz that may be transmitted by a wireless device in accordance with a PSD limit.

Throughout the description, similar reference numbers may be used to identify similar elements.

DETAILED DESCRIPTION

Figure 1:
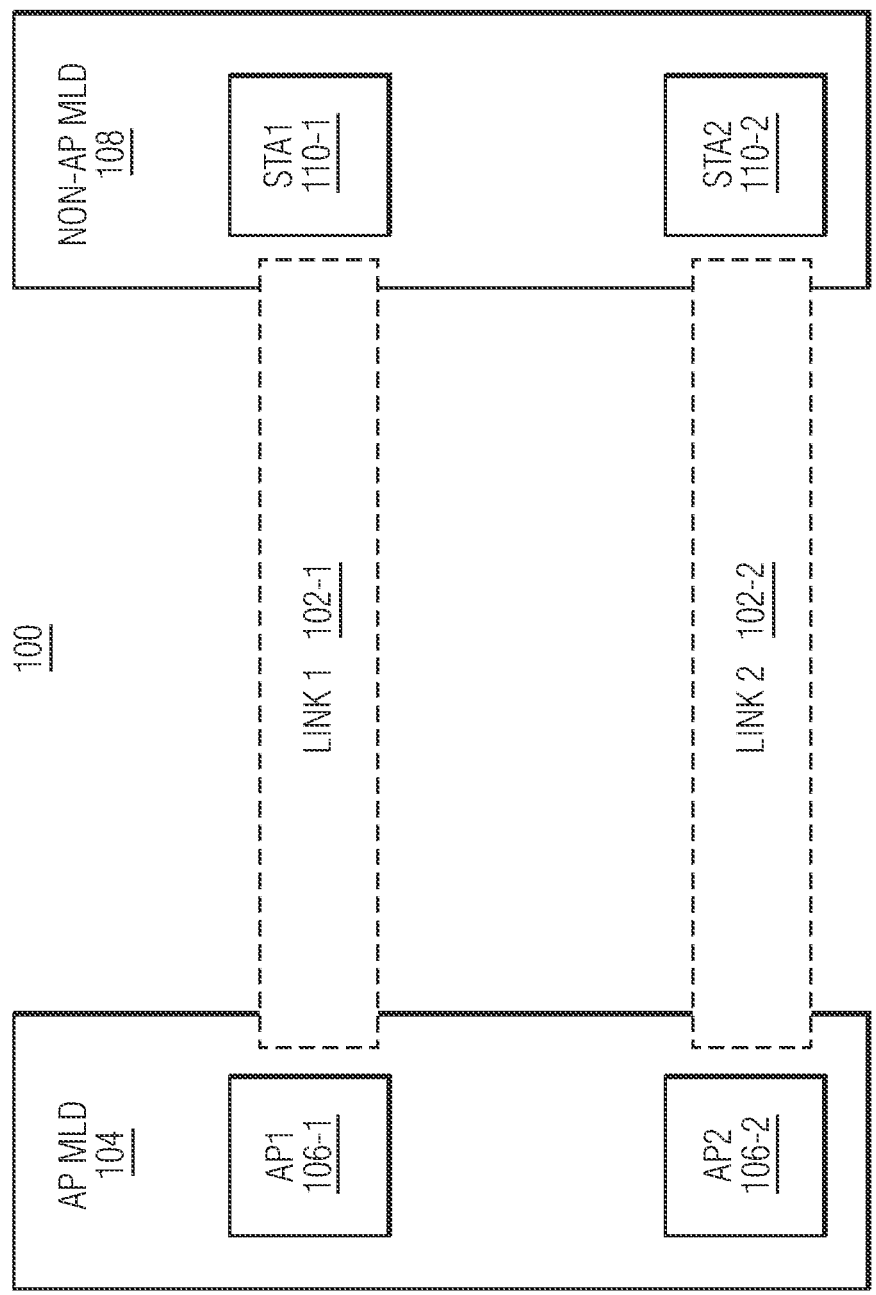
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-access point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first wireless device, and the non-AP MLD 108 may be a second wireless device. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., Beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device, such that the APs include a wireless network interface implemented on one more ICs. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two STAs (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device, such that the STAs include a wireless network interface device implemented on one or more ICs. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link 1 102-1 and link 2 102-2. For example, each of the STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz subchannels used to transmit frames in Physical Layer Convergence Procedure (PLCP) Protocol Data Units (PPDUs) (e.g., Date frames, Control frames, Management frames, Beacon frames, Action frames, etc.) between an AP MLD and a non-AP MLD. The PPDUs may be transmitted at signal bandwidths of, for example, 80 MHz, 160 MHz, or 320 MHz, and may include 20 MHz subchannels (sometimes referred to as "units"). In some embodiments, a 20 MHz subchannel may be a punctured 20 MHz subchannel (sometimes referred to as a "punctured subchannel" or a "punctured unit") or an unpunctured 20 MHz subchannel (sometimes referred to as an "unpunctured subchannel" or an "unpunctured unit). Similar subchannels or units of a PPDU may be aggregated to form larger units (sometimes referred to as "segments"). For example, two unpunctured subchannels may be aggregated to form one unpunctured segment with a bandwidth of 40 MHz. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via links 102-1 and 102-2, in other embodiments, the AP MLD 104 may communicate (e.g., wirelessly communicate) with the non-AP MLD 108 via more than two communication links or less than two communication links.

In some embodiments, wireless devices (e.g., APs or non-AP STAs) operating according to at least one legacy communication protocol may operate in a frequency band of less than 6 GHz. In some embodiments, frequency bands utilized in a less than 6 GHz range may include, for example, Unlicensed National Information Infrastructure (U-NII)-1, U-NII-2A, U-NII-2B, U-NII-2C, U-NII-3, U-NII-4, or U-NII-5. For wireless devices operating in frequency bands less than 6 GHz, there may be no power spectrum density (PSD) limit for wireless transmissions, or the PSD limit may be higher than a practical PSD of a packet that a STA can transmit. Instead, for wireless devices operating in frequency bands less than 6 GHz, there may be a per-STA Equivalent Isotopically Radiated Power (EIRP) limit. Thus, to extend transmission range in frequency bands less than 6 GHz, wireless devices (e.g., APs or non-AP STAs) operating according to at least one legacy communication protocol may, for example, reduce transmission bandwidth of a PPDU to increase per-subcarrier power.

However, in some embodiments, wireless devices (e.g., APs or non-AP STAs) operating according to at least one non-legacy communication protocol (e.g., the EHT communication protocol) may operate in a frequency band of 6 GHz. In some embodiments, frequency bands utilized within a 6 GHz range may include, for example, U-NII-5, U-NII-6, U-NII-7, or U-NII-8. In an embodiment, a low power indoor (LPI) transmission mode that may be in accordance with, for example, Federal Communications Commission (FCC) regulations, may be defined for transmissions in the frequency band of 6 GHz. In some embodiments, the LPI transmission mode may include a PSD limit for wireless devices (e.g., APs or non-AP STAs) transmitting PPDUs in the 6 GHz frequency band. For example, when a PPDU is transmitted in a frequency band of 6 GHz, the PSD may be limited to 5 decibel milliwatts (dBm) per 1 MHz for an AP and −1 dBm per 1 MHz for a non-AP STA. In such an example, a transmission range is achieved with a wider transmission bandwidth in PSD limited transmissions. To harvest transmission power in PSD limited transmissions, a PPDU with a duplicate (DUP) design and a distributed Resource Unit (RU) (dRU) may be transmitted by a wireless device. An example of a conventional PPDU with a DUP design and an example of a conventional technique for distributing an RU are described in further detail with reference to FIG. 2 and FIG. 3, respectively.

Figure 2:
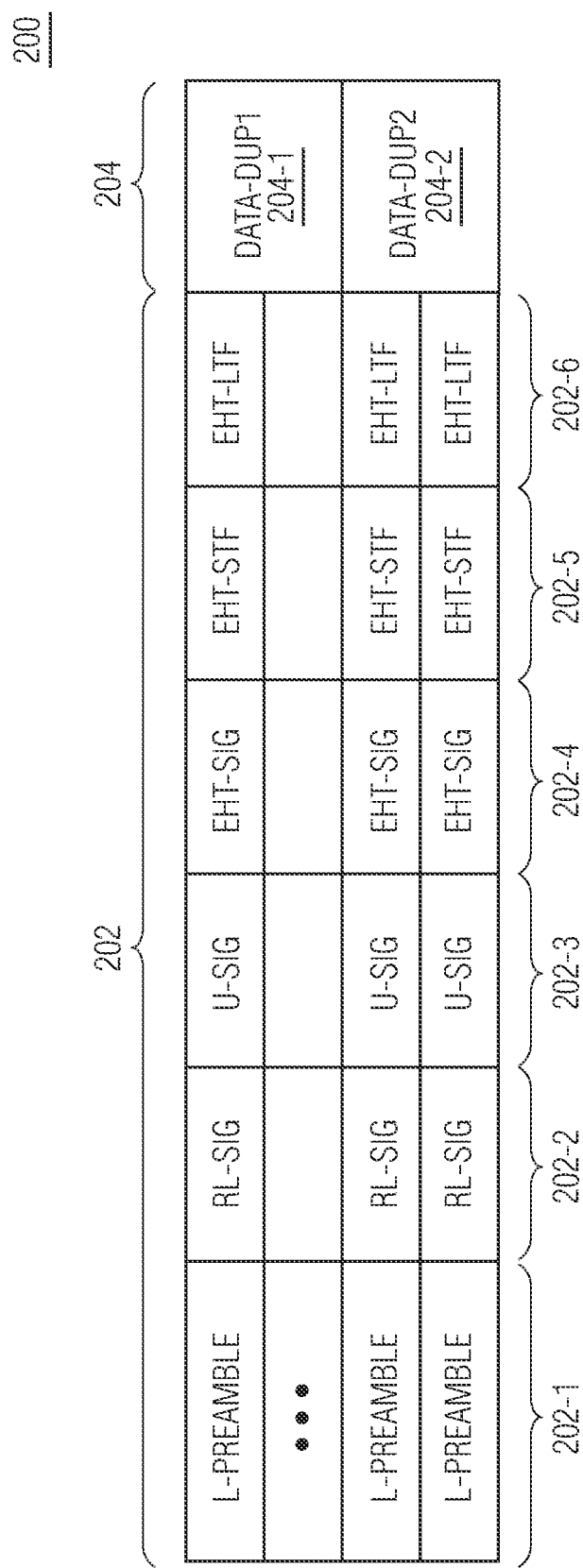
FIG. 2 depicts an example of a conventional Physical Layer Convergence Procedure (PLCP) Protocol Data Unit (PPDU) encoded with duplicated bits.

FIG. 2 depicts an example of a conventional PPDU, 200, encoded with duplicated bits. In some embodiments, the conventional PPDU 200 is an EHT-DUP PPDU that uses a data rate of at most binary phase shift keying (BPSK) Dual Carrier Modulation (DCM) (BPSK-DCM). The conventional PPDU 200 may improve transmission range for full-bandwidth single-user (SU) transmissions by duplicating a narrow band transmission across a wider signal bandwidth. In particular, FIG. 2 depicts a preamble portion 202 and a data portion 204 that are each included in the conventional PPDU 200. With reference to FIG. 2, each row included in the preamble portion 202 represents a 20 MHz subchannel of a signal bandwidth, such that the signal bandwidth may be, for example, 80 MHz, 160 MHz, or 320 MHz. In some embodiments, bits encoded in the preamble portion of the conventional PPDU 200 may include bandwidth information that indicates the signal bandwidth.

In an embodiment, the preamble portion 202 of the conventional PPDU 200 includes six fields that are duplicated for each 20 MHz subchannel of the signal bandwidth. The six fields of the preamble portion 202 are implemented as a Legacy Preamble field (L-Preamble) 202-1, a Repeated Legacy Signal field (RL-SIG) 202-2, a Universal Signal field (U-SIG) field 202-3, an EHT Signal field (EHT-SIG) 202-4, an EHT-Short Training field (EHT-STF) 202-5, and an EHT-Long Training field (EHT-LTF) 202-6.

In some embodiments, "duplicated" may imply that the contents (e.g., data, information, bits, etc.) of each field for a 20 MHz subchannel are duplicated across the signal bandwidth and/or are the same as for each corresponding field in other 20 MHz subchannels of the PPDU. For example, the contents of the first field 202-1 (shown as L-Preamble) in a first 20 MHz subchannel (shown by the first row) of the conventional PPDU 200 may be repeated and/or the same as the contents of the first field in a second 20 MHz subchannel (shown by the second row), a third 20 MHz subchannel (shown by the third row), a fourth 20 MHz subchannel (shown by the fourth row), and/or other 20 MHz subchannels (not shown) included in the signal bandwidth of the PPDU.

In an embodiment, the data portion 204 of the conventional PPDU 200 may include one or more segments implemented as Data-DUP1 204-1 and Data-DUP2 204-2. In such an embodiment, each data segment (e.g., Data-DUP1 204-1 and Data-DUP2 204-2) may be modulated using a basic bandwidth that is duplicated across one or more data segments of the signal bandwidth. In an embodiment, the basic bandwidth may be smaller than the signal bandwidth and may be defined as a portion of the signal bandwidth. For example, the data portion 204 of the conventional PPDU 200 shown in FIG. 2 includes two data segments (e.g., Data-DUP1 204-1 and Data-DUP2 204-2) that are each 160 MHz, that are modulated using an 80 MHz basic bandwidth, and that are duplicated across the 160 MHz data segments of the 320 MHz signal bandwidth, such that Data-DUP1 204-1 covers 160 MHz and Data-DUP2 204-2 covers 160 MHz. As another example (not shown), the data portion 204 of the conventional PPDU 200 may include one data segment, such that the data segment is 160 MHz and is modulated using an 80 MHz basic bandwidth and is duplicated across the 160 MHz signal bandwidth.

With reference to FIG. 2, in some embodiments, each basic bandwidth within the data portion 204 may be modulated using a data rate of at most BPSK-DCM, such that a lower-rate modulation scheme may be defined for the conventional PPDU 200. For example, the lower-rate modulation scheme may be Quadruple Carrier Mapping (QCM), BPSK-DCM+DUP, a one fourth (¼) coding rate, or other lower-rate modulation scheme. In some embodiments, a per-basic bandwidth polarity change or a per-subcarrier phase rotation may be applied to the data portion 204, such that the polarity change or the per-subcarrier phase change may be applied to reduce peak-to-average power ratio (PAPR).

Figure 3:
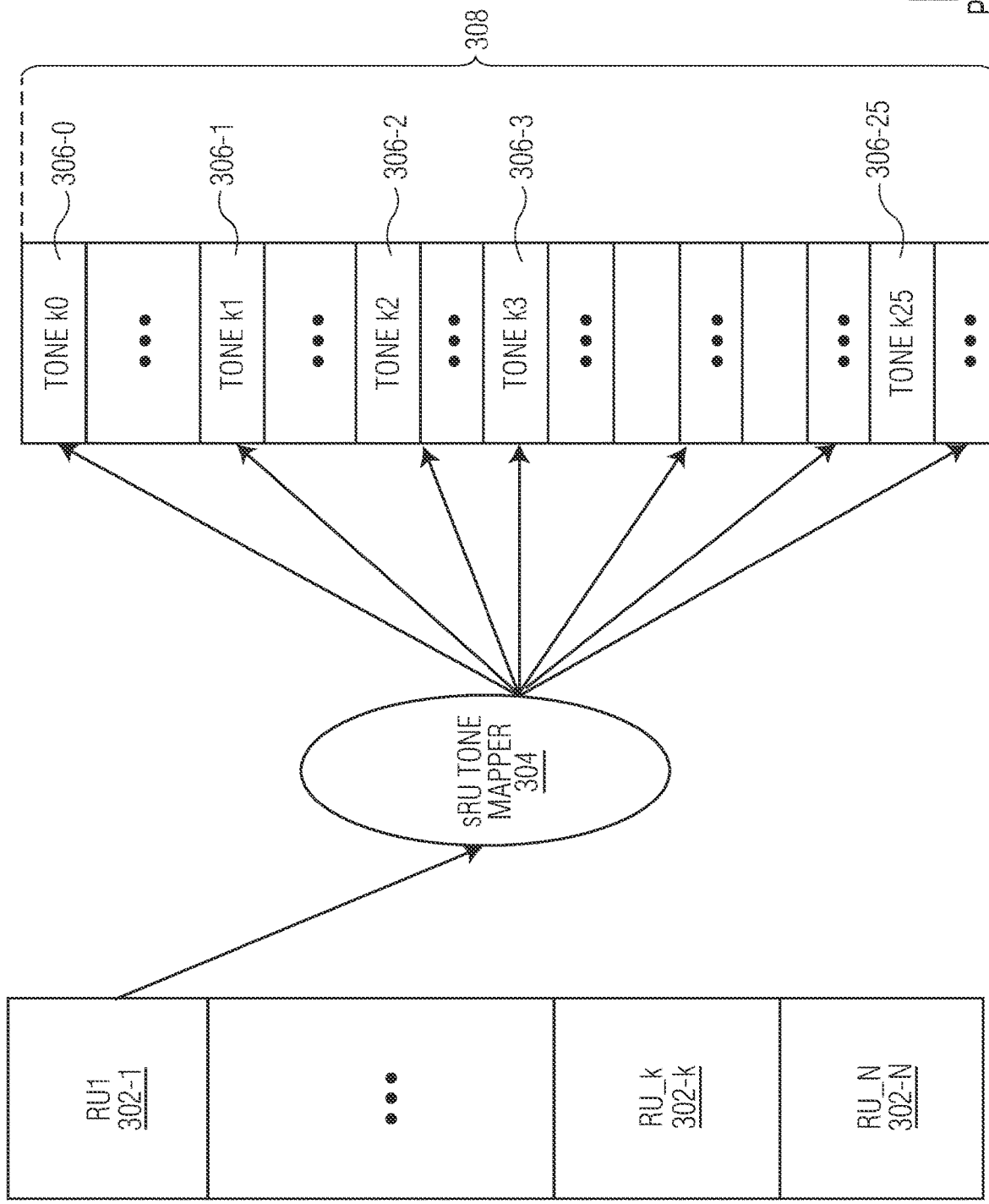
FIG. 3 illustrates a conventional technique for distributing a Resource Unit (RU).

FIG. 3 illustrates a conventional technique for distributing an RU. In an embodiment, an RU may be encoded and modulated using a logical RU, and loaded onto a dRU within a frequency unit (not shown) across a signal bandwidth (not shown) via a spreading RU (sRU) tone mapper 304. In some embodiments, the frequency unit may be 20 MHz, 40 MHz, or 80 MHz and the signal bandwidth may be 80 MHz, 160 MHz, or 320 MHz. In an embodiment, by spreading a logical RU onto a disjoint tone set, the logical RU occupies a wider bandwidth and allows for greater transmission power.

In an embodiment, a dRU may be defined as a set of distributed subcarriers within a frequency unit, such that data corresponding to the dRU may be encoded and modulated as one regular RU (e.g., RU1 302-1 and optionally RU_k 302-k and/or RU_N 302-N, where "k" is an integer greater than 1 and "N" is an integer greater than k). In particular, FIG. 3 illustrates the conventional technique for encoding the data portion of the PPDU as first encoding and modulating data for each dRU as one RU (e.g., RU1 302-1, RU_k 302-k, and RU_N 302-N). Using the RU (e.g., RU1 302-1), the sRU tone mapper 304 distributes data corresponding to the RU (e.g., RU1 302-1) onto a disjoint set of subcarriers 308 included in a frequency unit of the signal bandwidth. In some embodiments, a "subcarrier" may also be referred to as a "tone". In an embodiment, data corresponding to RU1 302-1 may be distributed onto subcarriers (e.g., Tone k0 306-0, Tone k1 306-1, Tone k2 306-2, Tone k3 306-3, and/or up to Tone k25 306-25) included in the disjoint set of subcarriers 308. The distance between two subcarriers (e.g., Tone k0 306-0 and Tone k1 306-1) included in the disjoint set of subcarriers 308 may be thirteen subcarriers (1 MHz) to maximize transmission power.

Although the conventional PPDU and the conventional technique for distributing an RU described with reference to FIG. 2 and FIG. 3 are supported by non-legacy communication protocols (e.g., the EHT communication protocol), the conventional PPDU and the conventional technique may not support PPDUs with dynamic puncturing. While it may not be necessary to avoid incumbents in lower-power transmissions, there may be future Automated Frequency Coordination (AFC) operating STAs that can transmit high-power narrow bandwidth PPDUs, and/or STAs operating in accordance with IEEE 802.11ax protocol with higher Clear Channel Assessment (CCA) sensitivity for wide bandwidth transmissions that cause Overlapping Basic Service Set (OBSS) interference to a BSS operating in accordance with IEEE 802.11be protocol. For example, STAs operating in accordance with IEEE 802.11ax protocol may not be designed to achieve long range in lower power communications. Consequently, as the number of Wi-Fi6E devices (e.g., devices operating in accordance with IEEE 802.11ax protocol) increases, Wi-Fi7 devices (e.g., devices operating in accordance with IEEE 802.11be protocol) may observe more interference. Thus, a PPDU design and encoding technique for PPDUs with dynamic puncturing that are transmitted in accordance with a PSD limit may need to be defined.

In accordance with an embodiment of the invention, a technique for PSD limited transmissions involves generating, by a wireless device, a PPDU that includes a base modulation frequency unit, wherein the base modulation frequency unit is duplicated to unpunctured subchannels of the PPDU with a phase rotation, and transmitting, by the wireless device, the PPDU in accordance with a PSD limit. In some embodiments, the PPDU is a non-orthogonal frequency-division multiple access (non-OFDMA) PPDU, where data is modulated on a basic bandwidth and duplicated across a signal bandwidth, and where a per-basic bandwidth polarity change, or a per-tone phase rotation is applied to the data. By duplicating a base modulation frequency unit to unpunctured subchannels of a PPDU with a phase rotation, the PPDU accounts for punctured subchannels and may be implemented in extended range (ER) transmissions. As such, PSD limited transmissions may be performed more efficiently, and wireless devices may experience an improvement of performance.

As described herein, a "base modulation frequency unit" (sometimes referred herein to as a "base unit") may be defined as a continuous frequency unit that is a fraction (or portion) of a signal bandwidth of a PPDU based on which information or data that is included in a data portion of the PPDU is modulated (e.g., a modulated signal). A modulated signal included in the base modulation frequency unit may then be duplicated multiple times to occupy unpunctured signal bandwidth of the PPDU. As described herein, "duplicated" may imply that the contents (e.g., data, information, bits, etc.) of a field (e.g., a 20 MHz subchannel field of a PPDU) are duplicated across a base modulation frequency unit or a signal bandwidth, and/or are the same for each corresponding field in other 20 MHz subchannels of the PPDU. As described herein, a "phase rotation" may imply that a number of phase rotation parameters may be applied to subcarriers included in each base modulation frequency unit within the signal bandwidth. In some embodiments, modulated bits may be duplicated and/or undergo phase rotation for each 20 MHz of the signal bandwidth.

In an embodiment, an IEEE 802.11be protocol defines punctured modes for SU transmissions. In such an embodiment, a PPDU with a signal bandwidth of 80 MHz may have one punctured 20 MHz subchannel, a PPDU with a signal bandwidth of 160 MHz may have one punctured 20 MHz subchannel or a 40 MHz puncture, and a PPDU with a signal bandwidth of 320 MHz may have a 40 MHz puncture, an 80 MHz puncture, or a 40+80 MHz puncture. For such punctured SU transmissions, it may be important to consider a trade-off between complexity and usefulness, and a balance between SU transmission and feedback Acknowledgement (Ack) or Block Ack (BA). For example, if BA or Ack has a 20 MHz Legacy-DUP (L-DUP), then there is a 6 decibel (dB) PSD limit difference between up-link (UL) and down-link (DL) transmissions. Additionally, a default preamble combining capability of an STA operating in accordance with IEEE 802.11be protocol may be 80 MHz.

In some embodiments, to further enhance transmission range of a PPDU, an EHT PPDU (e.g., a PPDU in accordance with IEEE 802.11be protocol) can leverage an ER preamble. The ER preamble may include a 3 dB L-Preamble power boost, a 3 dB L-SIG and RL-SIG edge tone power boost, and U-SIG repetition. However, for longer range transmission in PSD limited transmissions, a wide signal bandwidth may be needed to allow for more transmit power. As such, a 20 MHz ER preamble of an EHT PPDU may be duplicated across unpunctured 20 MHz subchannels of the PPDU's signal bandwidth (e.g., 80 MHz, 160 MHz, or 320 MHz). By duplicating the 20 MHz ER preamble, coexistence between Wi-Fi6 and AFC devices may be improved. Additionally, a data portion of the PPDU may have a lower rate than DCM+DUP (MCS14). In one embodiment, the data portion of the PPDU has a base modulation frequency unit that is one eighth (⅛) of a signal bandwidth with eight duplicates (e.g., 8*DUP). In another embodiment, the data portion of the PPDU has a base modulation frequency unit that is one fourth (¼) of a signal bandwidth with DCM and with four duplicates (e.g., DCM+4*DUP). In yet another embodiment, the data portion of the PPDU has a dRU that is spread within one eighth (⅛) of a signal bandwidth, where the dRU is then duplicated across the signal bandwidth.

In embodiments described herein, a base modulation frequency unit of a PPDU may be duplicated with a phase rotation. In one embodiment, the phase rotation is a per-unit (e.g., per-20 MHz) phase rotation that uses one phase rotation for each base modulation frequency unit. In such an embodiment, the base modulation frequency unit is 20 MHz, and the one phase rotation is a per-20 MHz phase rotation that uses a gamma rotation defined for a preamble portion of the PPDU. In another embodiment, the phase rotation is defined per-tone for each base modulation frequency unit as defined by equation (1):

$$d'_{k+i*N_{SD}/2} = d'_k * e^{j\theta_{i,k}} \quad (1)$$

where d' represents modulated data, k represents a subcarrier of the base modulation frequency unit (e.g., 0, 1, ... ), i represents an index of the base modulation frequency unit (e.g., 0, 1, 2, ... , M−1), $N_{SD}$ represents a number of subcarriers included in the base modulation frequency unit (e.g., $N_{SD}/2−1$), and j represents an imaginary unit that has a property of $j^2=−1$. In yet another embodiment, the phase rotation is defined by equation (2):

$$d'_{k+i*N_{SD}/8} = d'_k * e^{j\theta_{i,k}} \quad (2)$$

where d' represents modulated data, k represents a subcarrier of the base modulation frequency unit (e.g., 0, 1, ... ), i represents an index of the base modulation frequency unit (e.g., 0, 1, 2, ... , M−1), $N_{SD}$ represents a number of subcarriers included in the base modulation frequency unit (e.g., $N_{SD}/8−1$), and j represents an imaginary unit that has a property of $j^2=−1$. The phase rotation defined by equation (2) may be applied per-tone (e.g., +1/−1/j/−j), or per-unit (e.g., per-20 MHz) phase rotation in each duplication.

In an embodiment, a signal bandwidth of a PPDU may be 80 MHz. A PPDU with a full bandwidth of 80 MHz (i.e., with no punctured subchannels) may have an ER definition of Modulation and Coding Scheme (MCS) 14 (MCS14) (DCM+DUP). When the PPDU has a signal bandwidth of 80 MHz, the PPDU may have one punctured 20 MHz subchannel. As an example, an allowed punctured SU transmission of the PPDU is 60 MHz, such that the PPDU may include a 484+242 RU. In one embodiment, when the signal bandwidth of the PPDU is 80 MHz with a punctured 20 MHz subchannel, a base modulation frequency unit and duplication scheme is 242 RU modulated via MCS 0 (MCS0) and tri-subcarrier modulation (TCM) (e.g., 242 MCS0+TCM) is applied to occupy an unpunctured 60 MHz channel. In such an embodiment, a variation may be to allow each 20 MHz subchannel of the PPDU to be modulated via MCS0+DCM. Additionally, the same modulated data on one 20 MHz subchannel may be duplicated across unpunctured subchannels. In another embodiment, when the signal bandwidth of the PPDU is 80 MHz with a punctured 20 MHz subchannel, the base modulation frequency unit is 242 RU modulated via MCS0 and 484 RU modulated with MCS0 and DCM (e.g., 242 MCS0+484 MCS0+DCM). Examples of PPDUs with a signal bandwidth of 80 MHz are described in further detail with reference to FIGS. 4A-4C.

Figure 4A:
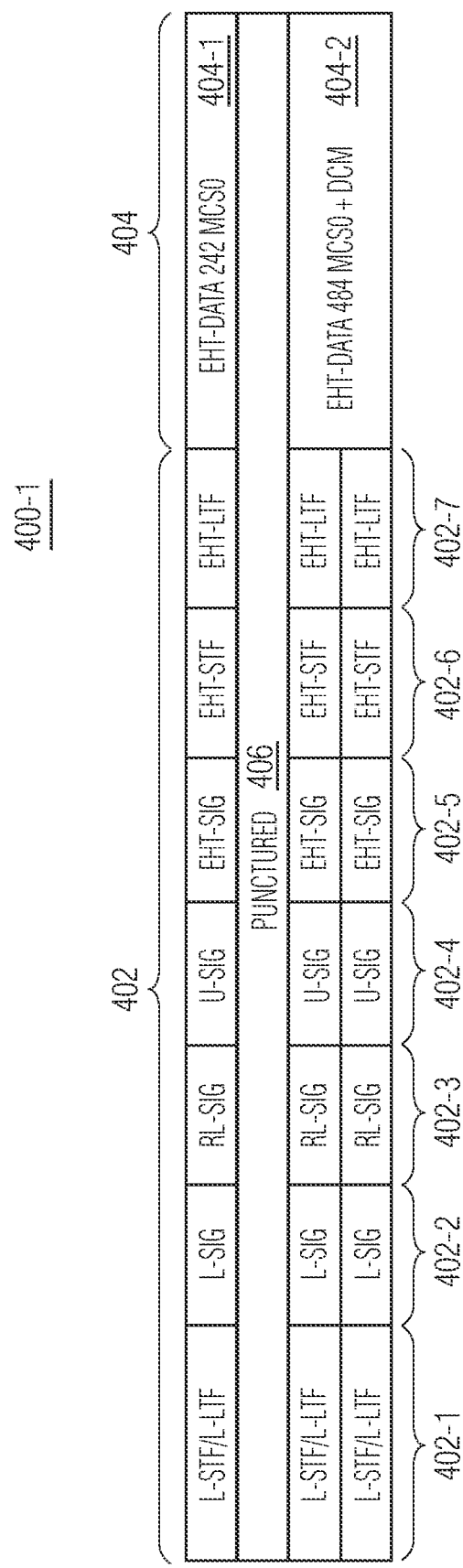
FIG. 4A depicts an example of a PPDU with a signal bandwidth of 80 megahertz (MHz) that may be transmitted by a wireless device in accordance with a power spectrum density (PSD) limit.

FIG. 4A depicts an example of a PPDU, 400-1, with a signal bandwidth of 80 MHz that may be transmitted by a wireless device in accordance with a PSD limit. The PPDU 400-1 includes a preamble portion 402 and a data portion 404 as described with reference to FIG. 2.

In contrast to FIG. 2, the preamble portion 402 of the PPDU 400-1 shown in FIG. 4A includes seven fields implemented as a Legacy STF (L-STF) or Legacy LTF (L-LTF) (L-STF/L-LTF) 402-1, L-SIG 402-2, RL-SIG 402-3, U-SIG 402-4, EHT-SIG 402-5, EHT-STF 402-6, and EHT-LTF 402-7. Additionally, the PPDU 400-1 includes a punctured 20 MHz subchannel 406. Because of the punctured 20 MHz subchannel, the PPDU is split into a combination of 40 MHz MCS0+DCM (bottom two rows) and 20 MHz MCS0 (top row). As such, the data portion 404 includes two segments implemented as EHT-Data 242 MCS0 404-1 and EHT-Data 484 MCS0+DCM 404-2. In an embodiment, EHT-Data 242 MCS0 404-1 is a base modulation frequency unit, such that EHT-Data 484 MCS0+DCM 404-2 is two duplicates (e.g., 2*DUP) of EHT-Data 242 MCS0 404-1. In some embodiments, the data portion 404 may have a per-unit phase rotation, or a phase rotation defined by equation (1).

With reference to FIG. 4A, each row included in the preamble portion 402 and the data portion 404 may represent a 20 MHz subchannel of a signal bandwidth, such that the signal bandwidth may be 80 MHz. In some embodiments, bits encoded in the preamble portion of the PPDU 400-1 may include bandwidth information that indicates the signal bandwidth.

Figure 4B:
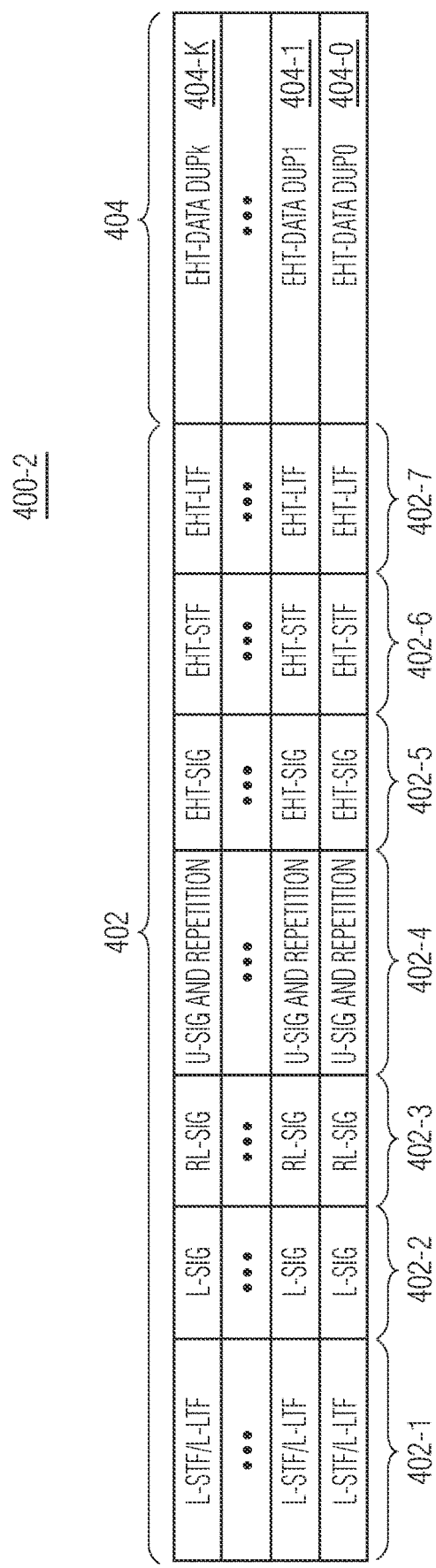
FIG. 4B depicts another example of a PPDU with a signal bandwidth of 80 MHz that may be transmitted by a wireless device in accordance with a PSD limit.

FIG. 4B depicts another example of a PPDU, 400-2, with a signal bandwidth of 80 MHz that may be transmitted by a wireless device in accordance with a PSD limit. The PPDU 400-2 includes a preamble portion 402 that includes L-STF/L-LTF 402-1, L-SIG 402-2, RL-SIG 402-3, EHT-SIG 402-5, EHT-STF 402-6, and EHT-LTF 402-7, and a data portion 404 as described with reference to FIG. 4A.

In contrast to FIG. 4A, the PPDU 400-2 shown in FIG. 4B does not include a punctured 20 MHz subchannel. Additionally, the preamble portion 402 includes a U-SIG and repetition field 402-4, and the data portion 404 includes data segments implemented as EHT-Data DUPk 404-K, EHT-Data DUP1 404-1, and EHT-Data DUP0 404-0. In an embodiment, EHT-Data DUPk 404-K is a base modulation frequency unit, such that EHT-Data DUPk 404-K is duplicated to unpunctured subchannels of the data portion 404 (e.g., EHT-Data DUP1 404-1 and EHT-Data DUP0 404-0) within the 80 MHz signal bandwidth of the PPDU. As an example, the base modulation frequency unit and duplication scheme is 242 RU modulated via MCS0-DCM with four duplicates (base unit is duplicated four times) (e.g., 242 MCS0-DCM+4*DUP) to occupy the 80 MHz signal bandwidth, such that data is encoded and modulated based on MCS0+DCM within the 242 RU. In some embodiments, the data portion 404 may have a per-unit phase rotation, or a phase rotation defined by equation (2).

Figure 4C:
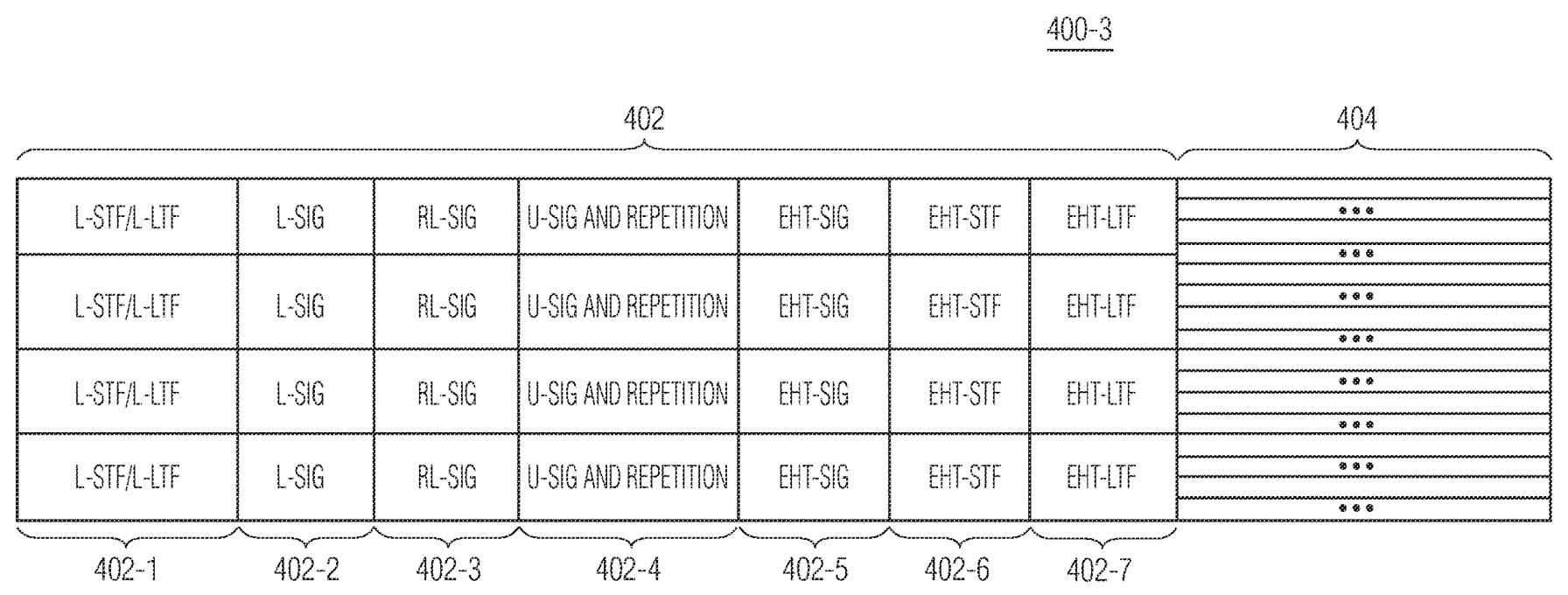

FIG. 4C depicts another example of a PPDU, 400-3, with a signal bandwidth of 80 MHz that may be transmitted by a wireless device in accordance with a PSD limit. The PPDU 400-3 includes a preamble portion 402 that includes L-STF/L-LTF 402-1, L-SIG 402-2, RL-SIG 402-3, U-SIG and repetition field 402-4, EHT-SIG 402-5, EHT-STF 402-6, and EHT-LTF 402-7, and a data portion 404 as described with reference to FIG. 4B.

In contrast to FIG. 4B, the data portion 404 of the PPDU 400-3 shown in FIG. 4C has a base modulation frequency unit that is 106 dRU modulated via MCS0. In an embodiment, the 106 dRU is distributed over the 80 MHz signal bandwidth.

In an embodiment, a signal bandwidth of a PPDU may be 160 MHz. When the PPDU has a signal bandwidth of 160 MHz, the PPDU may have one or more punctured 20 MHz subchannels. As an example, an allowed punctured SU transmission of the PPDU is 120 MHz or 140 MHz, such that the PPDU may include 996+484 RU or 996+484+242 RU, respectively.

In one embodiment, when the signal bandwidth of the PPDU is 160 MHz with one or more punctured 20 MHz subchannels (e.g., 120 MHz or 140 MHz), a base modulation frequency unit and duplication scheme is 242 RU modulated via MCS0 with N duplicates (base unit is duplicated N times) (e.g., 242 MCS0+N*DUP), where N=6 for a 120 MHz bandwidth and N=7 for a 140 MHz bandwidth. In another embodiment, when the signal bandwidth of the PPDU is 160 MHz with more than one punctured 20 MHz subchannel (e.g., 120 MHz), the base modulation frequency unit and duplication scheme is 484+242 RU modulated via MCS0 with two duplicates (base unit is duplicated twice) (e.g., 484+242 MCS0+2*DUP). In yet another embodiment, when the signal bandwidth of the PPDU is 160 MHz with more than one punctured 20 MHz subchannel (e.g., 120 MHz), the base modulation frequency unit and duplication scheme is 484 RU modulated via MCS0 with three duplicates (base unit is duplicated three times) (e.g., 484 MCS0+3*DUP). In such embodiments, PAPR of the PPDU may be reduced by applying a per-unit phase rotation or a phase rotation defined by equation (1). An example of a PPDU with a signal bandwidth of 160 MHz is described in further detail with reference to FIG. 5.

Figure 5:
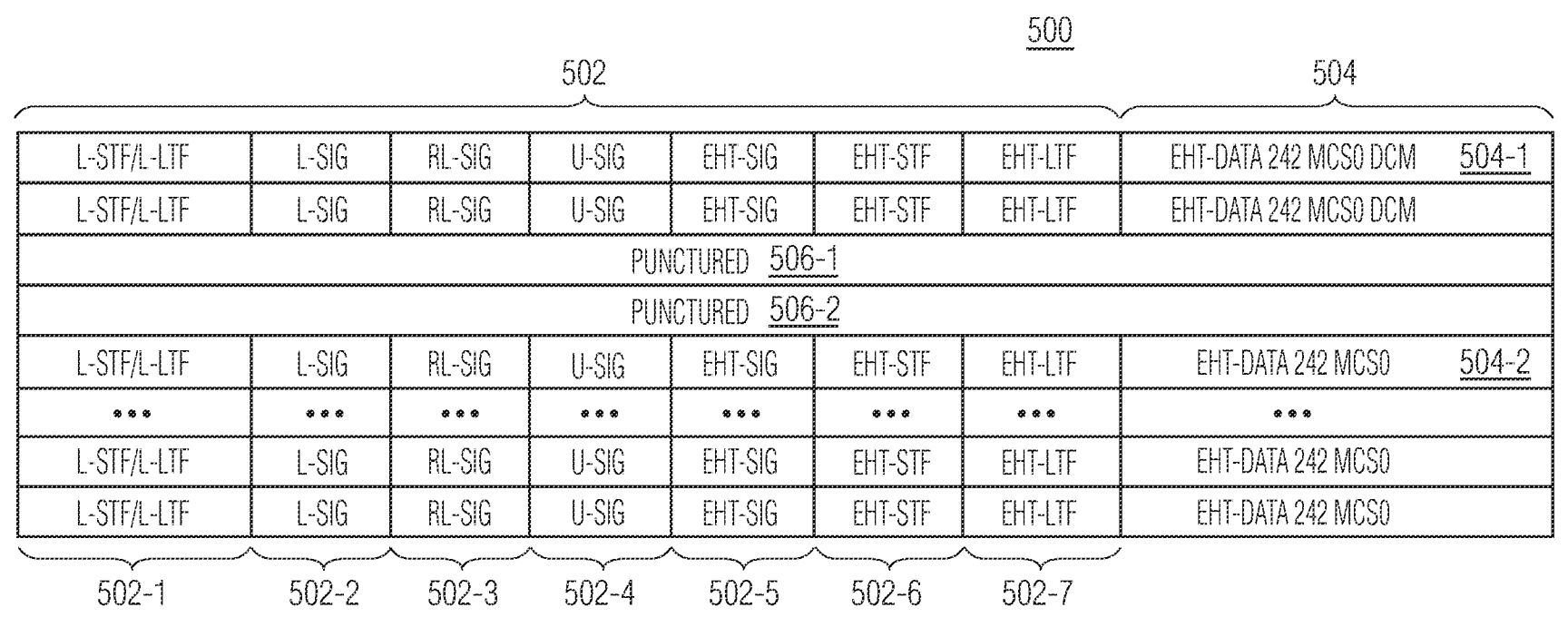

FIG. 5 depicts an example of a PPDU, 500, with a signal bandwidth of 160 MHz that may be transmitted by a wireless device in accordance with a PSD limit. The PPDU 500 includes a preamble portion 502 that includes L-STF/L-LTF 502-1, L-SIG 502-2, RL-SIG 502-3, U-SIG 502-4, EHT-SIG 502-5, EHT-STF 502-6, and EHT-LTF 502-7, and a data portion 504 as described with reference to FIG. 4A.

In contrast to FIG. 4A, the PPDU 500 shown in FIG. 5 includes two punctured 20 MHz subchannels implemented as a first punctured 20 MHz subchannel 506-1 and a second punctured 20 MHz subchannel 506-2. Because of the punctured 20 MHz subchannels 506-1 and 506-2, the PPDU is split into a combination of 40 MHz MCS (top two rows) and 80 MHz MCS0+DCM (bottom four rows). In an embodiment, the data portion 504 includes base modulation frequency units EHT-Data 242 MCS0 DCM 504-1 and EHT-Data 242 MCS0 504-2 that are duplicated to unpunctured subchannels. As such, EHT-Data 242 MCS0 DCM 504-1 is duplicated for the 40 MHz MCS (e.g., 484 RU), and EHT-Data 242 MCS0 504-2 is duplicated for the 80 MHz MCS0+DCM (e.g., 996 RU). In some embodiments, the data portion 504 may have a per-unit phase rotation, or a phase rotation defined by equation (1). In an embodiment, each row included in the preamble portion 502 and the data portion 504 may represent a 20 MHz subchannel of a signal bandwidth, such that the signal bandwidth may be 160 MHz.

In contrast to FIG. 5, in some embodiments, a PPDU (e.g., an EHT PPDU) has a signal bandwidth of 160 MHz and does not include punctured 20 MHz subchannels. In such an embodiment, a data portion of the PPDU includes a base modulation frequency unit that may be 242 RU modulated via MCS0 with eight duplicates (base unit is duplicated eight times) (e.g., 242 MCS0+8*DUP), 484 RU modulated via MCS0-DCM with four duplicates (base unit is duplicated four times) (e.g., 484 MCS0-DCM+4*DUP), 242 RU distributed over 160 MHz and modulated via MCS0 (e.g., 242 dRU MCS0), or 242 RU distributed over 80 MHz and duplicated to another 80 MHz (e.g., 242 MCS0+DUP).

In one embodiment, when the PPDU has a signal bandwidth of 160 MHz and a base modulation frequency unit that is 242 RU modulated via MCS0 with eight duplicates (base unit is duplicated eight times), the data may be encoded and modulated based on MCS0 within a 242 RU. In such an embodiment, modulated data is duplicated to unpunctured 20 MHz subchannels within the 160 MHz signal bandwidth. Additionally, PAPR of the PPDU may be reduced by applying a per-unit phase rotation, a per-tone phase rotation defined by equation (2), or a per-unit phase rotation in each duplication.

In another embodiment, when the PPDU has a signal bandwidth of 160 MHz and a base modulation frequency unit that is 484 RU modulated via MCS0-DCM with four duplicates (base unit is duplicated four times), the data may be encoded and modulated based on MCS0+DCM within a 484 RU. In such an embodiment, modulated data is duplicated to unpunctured 40 MHz channels within the 160 MHz signal bandwidth. Additionally, PAPR of the PPDU may be reduced by applying a per-unit phase rotation, a per-tone phase rotation defined by equation (2), or a per-unit phase rotation in each duplication.

In yet another embodiment, when the PPDU has a signal bandwidth of 160 MHz and a base modulation frequency unit that is 242 RU distributed (e.g., a 242-tone dRU) over 80 MHz and the base modulation frequency unit is duplicated to another 80 MHz, the data may be modulated based on MCS0. In such an embodiment, PAPR of the PPDU may be reduced by applying a per-80 MHz phase rotation.

In an embodiment, a signal bandwidth of a PPDU may be 320 MHz. When the PPDU has a signal bandwidth of 320 MHz, the PPDU may have multiple punctured 20 MHz subchannels. As an example, an allowed punctured SU transmission of the PPDU is 200 MHz, 240 MHz, or 280 MHz, such that the PPDU may include 996*2+484 RU, 996*3 RU, or 996*3+484 RU, respectively.

In one embodiment, when the signal bandwidth of the PPDU is 320 MHz with multiple punctured 20 MHz subchannels (e.g., 200 MHz, 240 MHz, or 280 MHz), a base modulation frequency unit and duplication scheme is 242 RU modulated via MCS0 with N duplicates (base unit is duplicated N times) (e.g., 242 MCS0+N*DUP), where N=10 for a 200 MHz bandwidth, N=12 for a 240 MHz bandwidth, and N=14 for a 280 MHz bandwidth. In another embodiment, when the signal bandwidth of the PPDU is 320 MHz with multiple punctured 20 MHz subchannels (e.g., 200 MHz, 240 MHz, or 280 MHz), the base modulation frequency unit and duplication scheme is 484 RU modulated via MCS0 with N duplicates (e.g., 484 MCS0+N*DUP), where N=5 for the 200 MHz bandwidth, N=6 for the 240 MHz bandwidth, and N=7 for the 280 MHz bandwidth. In yet another embodiment, when the signal bandwidth of the PPDU is 320 MHz with multiple punctured 20 MHz subchannels (e.g., 240 MHz), the base modulation frequency unit and duplication scheme is 996 RU modulated via MCS0 with three duplicates (base unit is duplicated three times) (e.g., 996 MCS0+3*DUP) for the 240 MHz bandwidth. In such embodiments, PAPR of the PPDU may be reduced by applying a per-unit phase rotation or a phase rotation defined by equation (1). An example of a PPDU with a signal bandwidth of 320 MHz is described in further detail with reference to FIG. 6.

Figure 6:
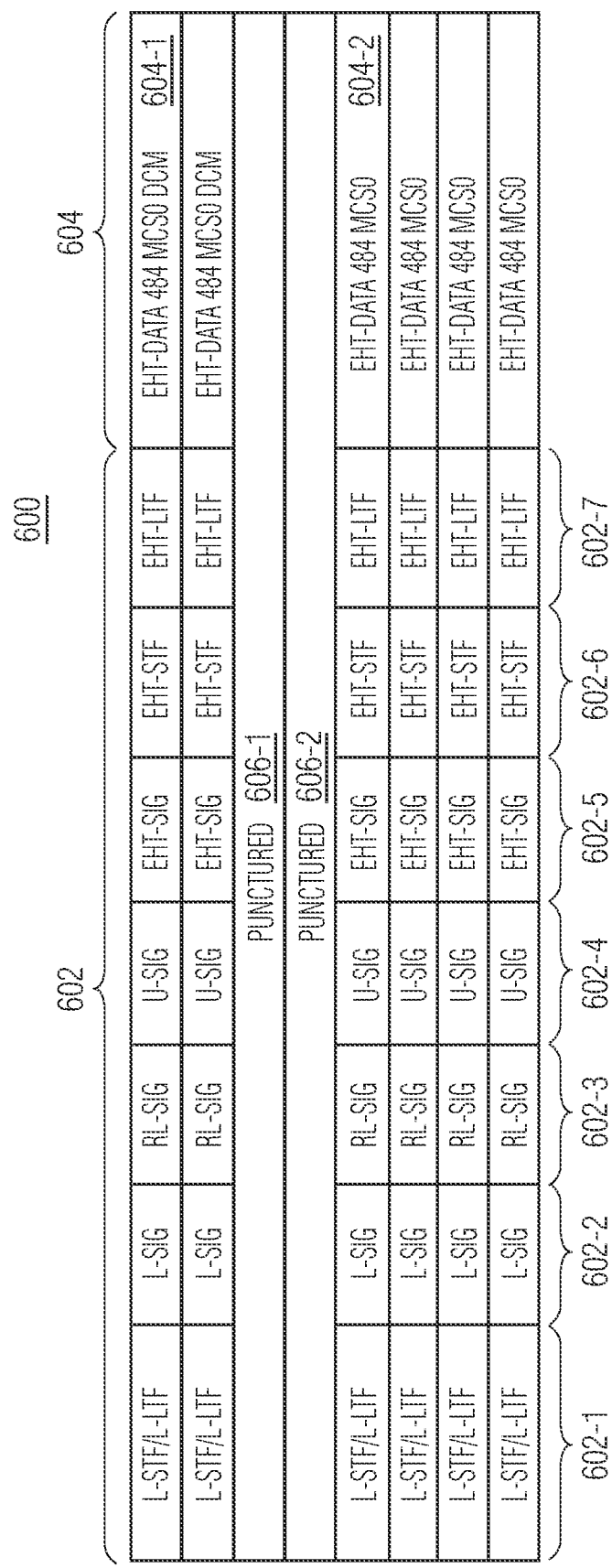
FIG. 6 depicts an example of a PPDU with a signal bandwidth of 320 MHz that may be transmitted by a wireless device in accordance with a PSD limit.

FIG. 6 depicts an example of a PPDU, 600, with a signal bandwidth of 320 MHz that may be transmitted by a wireless device in accordance with a PSD limit. The PPDU 600 includes a preamble portion 602 that includes L-STF/L-LTF 602-1, L-SIG 602-2, RL-SIG 602-3, U-SIG 602-4, EHT-SIG 602-5, EHT-STF 602-6, and EHT-LTF 602-7, and a data portion 604 as described with reference to FIG. 5.

In contrast to FIG. 5, the PPDU 600 shown in FIG. 6 includes two punctured 40 MHz channels implemented as a first punctured 40 MHz channel 606-1 and a second punctured 40 MHz channel 606-2. Because of the punctured 40 MHz channels 606-1 and 606-2, the PPDU is split into a combination of 80 MHz MCS (top two rows) and 160 MHz MCS0+DCM (bottom four rows). As such, the data portion 604 includes EHT-Data 484 MCS0 DCM 604-1 that is duplicated for the 80 MHz MCS, and EHT-Data 484 MCS0 604-2 that is duplicated for the 160 MHz MCS0+DCM. As such, EHT-Data 484 MCS0 DCM 604-1 and/or EHT-Data 484 MCS0 604-2 may be base modulation frequency units that are duplicated to unpunctured subchannels. In some embodiments, the data portion 604 may have a per-unit phase rotation, or a phase rotation defined by equation (1). In an embodiment, each row included in the preamble portion 602 and the data portion 604 may represent a 40 MHz channel of a signal bandwidth, such that the signal bandwidth may be 320 MHz.

In contrast to FIG. 6, in some embodiments, a PPDU (e.g., an EHT PPDU) has a signal bandwidth of 320 MHz and does not include punctured 40 MHz channels. In such an embodiment, a data portion of the PPDU includes a base modulation frequency unit that may be 484 RU modulated via MCS0 with eight duplicates (base unit is duplicated eight times) (e.g., 484 MCS0+8*DUP), 996 RU modulated via MCS0-DCM with four duplicates (base unit is duplicated four times) (e.g., 996 MCS0-DCM+4*DUP), or 484 RU distributed over 320 MHz and modulated via MCS0 (e.g., 484 MCS0).

In one embodiment, when the PPDU has a signal bandwidth of 320 MHz and a base modulation frequency unit that is 484 RU modulated via MCS0 with eight duplicates (base unit is duplicated eight times), the data may be encoded and modulated based on MCS0 within a 484 RU. In such an embodiment, modulated data is duplicated to unpunctured 40 MHz channels within the 320 MHz signal bandwidth. Additionally, PAPR of the PPDU may be reduced by applying a per-40 MHz phase rotation, a per-tone phase rotation defined by equation (2), or a per-40 MHz phase rotation in each duplication.

In another embodiment, when the PPDU has a signal bandwidth of 320 MHz and a base modulation frequency unit that is 996 RU modulated via MCS0-DCM with four duplicates (base unit is duplicated four times), the data may be encoded and modulated based on MCS0+DCM within a 996 RU. In such an embodiment, modulated data is duplicated to unpunctured 80 MHz channels within the 320 MHz signal bandwidth. Additionally, PAPR of the PPDU may be reduced by applying a per-80 MHz phase rotation, a per-tone phase rotation defined by equation (2), or a per-80 MHz phase rotation in each duplication.

In yet another embodiment, when the PPDU has a signal bandwidth of 320 MHz and a base modulation frequency unit that is 484 RU distributed (e.g., 484-tone dRU) over 320 MHz and modulated via MCS0, the data may be modulated based on MCS0. Variations of such an embodiment include, for example, a 484 RU distributed (e.g., 484-tone dRU) over an 80 MHz segment and duplicated to the other three 80 MHz segments that are modulated via MCS0 with an optional per-80 MHz phase rotation, a 484 RU distributed over one 160 MHz segment and duplicated to the other 160 MHz segment, and/or a 996 RU distributed (e.g., 996-tone dRU) over one 320 MHz segment with MCS0-DCM.

In some embodiments, to balance complexity and range extension, not all punctured ER transmissions may need to be defined. In such an embodiment, a transmitter (e.g., a wireless device) may choose a largest possible ER transmission RU size or multiple RU (MRU) size based on a signal bandwidth and punctured subchannels of a PPDU. As an example, an ER format may be chosen from 996, 996*2, 996*3, or 996*4. In such an example, for a 160 MHz signal bandwidth with a 40 MHz puncture or a 20 MHz puncture, 996 MCS14 is used, for a 320 MHz signal bandwidth with a 120 MHz puncture, 996*2 MCS14 is used, and for a 320 MHz signal bandwidth with a 40 MHz puncture or an 80 MHz puncture, 996*3 DUP is used. As another example, an ER format may be chosen from 242 with 3*DUP for 80 MHz, 484 with 3*DUP for 160 MHz, or 996 with 3*DUP for 320 MHz. In such an example, for an 80 MHz signal with a 20 MHz puncture, 242 with 3*DUP is used, for a 160 MHz signal bandwidth with a 40 MHz puncture or a 20 MHz puncture, 484 with 3*DUP is used, for a 320 MHz signal bandwidth with 120 MHz puncture, 996*2 MCS14 is used, and for a 320 MHz signal bandwidth with a 40 MHz puncture or an 80 MHz puncture, 996 with 3*DUP is used.

When encoding a data portion of a PPDU that does not include punctured 20 MHz subchannels, the conventional technique illustrated in FIG. 3 may be used. A similar technique may also be used when the PPDU includes punctured 20 MHz subchannels and is transmitted according to a PSD limited transmission. Examples of the PSD limited transmission include an EHT orthogonal frequency-division multiple access (OFDMA) ER transmission and/or an EHT transmission using dRU. For example, a technique for encoding a data portion of a PPDU may include distributing a smaller RU over a predefined punctured spreading bandwidth within a base modulation frequency unit, distributing a smaller RU over a predefined contiguous spreading bandwidth within the base modulation frequency unit, and/or distributing a smaller RU over a predefine base spreading frequency unit.

In an embodiment, when a PPDU is transmitted via a punctured EHT OFDMA ER transmission or an EHT transmission using dRU, an RU is distributed over a predefined punctured spreading bandwidth within a base modulation frequency unit. In such an embodiment, a tone distribution may be defined for allowed punctured bandwidth within the base modulation frequency unit. For example, if the base modulation frequency unit is 80 MHz, then the RU can be distributed over a 20 MHz subchannel, a 40 MHz segment, or a 60 MHz segment (e.g., 484+242) depending on punctured 20 MHz subchannels.

In another embodiment, when a PPDU is transmitted via a punctured EHT OFDMA ER transmission or an EHT transmission using dRU, an RU is distributed over a predefined contiguous spreading bandwidth within a base modulation frequency unit and the dRU is duplicated within the signal bandwidth. In such an embodiment, a tone distribution may be defined for contiguous bandwidth within the base modulation frequency unit. For example, if the base modulation frequency unit is 80 MHz, then the RU can be distributed over a 20 MHz subchannel or a 40 MHz segment.

In yet another embodiment, when a PPDU is transmitted via a punctured EHT OFDMA ER transmission or an EHT transmission using dRU, an RU is distributed over a predefined base modulation frequency unit. In such an embodiment, a tone distribution may be defined for one spreading bandwidth within the base modulation frequency unit. In one embodiment, there is one spreading bandwidth for different signal bandwidths of a PPDU. As an example, a PPDU with a signal bandwidth of 80 MHz has a spreading bandwidth of 20 MHz. As another example, a PPDU with a signal bandwidth of 160 MHz or 320 MHz has a spreading bandwidth of 40 MHz. In another embodiment, there is one spreading bandwidth for all signal bandwidths of a PPDU. As an example, a PPDU with a signal bandwidth of 80 MHz, 160 MHz, or 320 MHz has a spreading bandwidth of 20 MHz.

Examples of techniques for distributing an RU across a signal bandwidth with a punctured subchannel are described in further detail with reference to FIGS. 7A-7B.

Figure 7A:
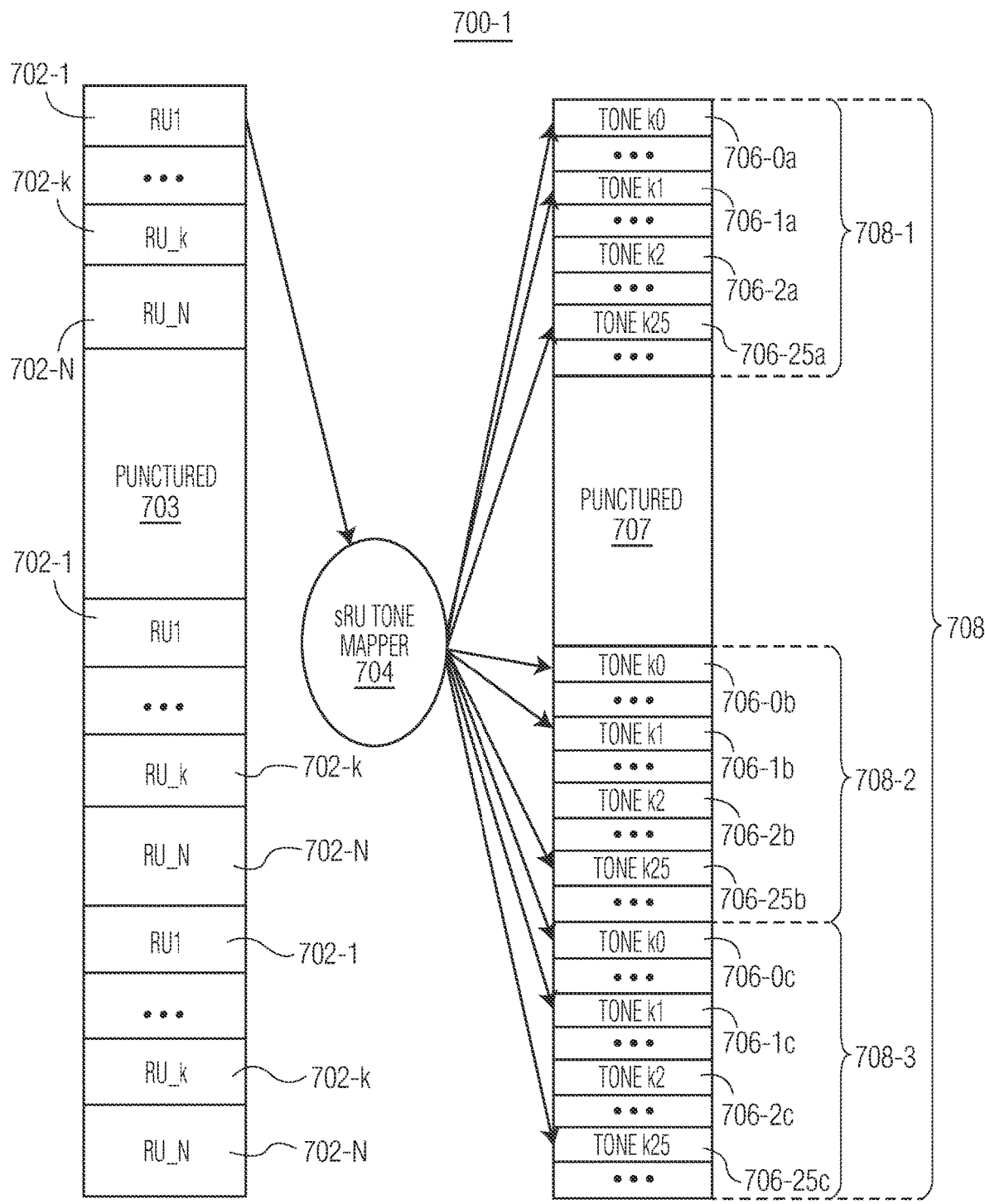
FIG. 7A illustrates a technique for distributing an RU across a signal bandwidth with a punctured subchannel.

FIG. 7A illustrates a technique, 700-1, for distributing an RU (e.g., RU1 702-1, RU_k 702-k, and/or RU_N 702-N) across a signal bandwidth 708 with a punctured subchannel 707. In an embodiment, the technique 700-1 includes distributing the RU over a predefined punctured spreading bandwidth within a base modulation frequency unit (e.g., a first base modulation frequency unit 708-1, a second base modulation frequency unit 708-2, or a third base modulation frequency unit 708-3). In particular, FIG. 7A illustrates spreading RU1 702-1 onto the base modulation frequency units 708-1, 708-2, and 708-3 of the signal bandwidth 708 of a PPDU. In some embodiments, the base modulation frequency units may be 20 MHz, 40 MHz, or 80 MHz, and the signal bandwidth may be 80 MHz, 160 MHz, or 320 MHz. By spreading the RU within the base modulation frequency units, punctured subchannels are accounted for when encoding and modulating the RU.

The technique 700-1 includes encoding and modulating RU1 702-1 within the base modulation frequency units 708-1, 708-2, and 708-3 of the signal bandwidth 708 via an sRU tone mapper 704. Using RU1 702-1, the sRU tone mapper 704 distributes data corresponding to RU1 702-1 onto subcarriers included in the base modulation frequency units 708-1, 708-2, and 708-3, such that the sRU tone mapper does not distribute data to the punctured subchannel 707. In an embodiment, RU1 702-1 may be distributed onto Tone k0 706-0a, Tone k1 706-1a, Tone k2 706-2a, Tone k3 706-3a, and to Tone k25 706-25a of the first base modulation frequency unit 708-1, onto Tone k0 706-0b, Tone k1 706-1b, Tone k2 706-2b, Tone k3 706-3b, and to Tone k25 706-25b of the second base modulation frequency unit 708-2, and onto Tone k0 706-0c, Tone k1 706-1c, Tone k2 706-2c, Tone k3 706-3c, and to Tone k25 706-25c of the third base modulation frequency unit 708-3.

In an embodiment, the signal bandwidth 708 of the PPDU is 80 MHz, the punctured subchannel 707 is 20 MHz, and the base modulation frequency units 708-1, 708-2, and 708-3 are 20 MHz. In such an embodiment, the first base modulation frequency unit 708-1 corresponds to a 242 RU, and the second and third base modulation frequency units 708-2, 708-3 correspond to a 484 RU. In some embodiments, the RUs include a punctured segment 703.

Figure 7B:
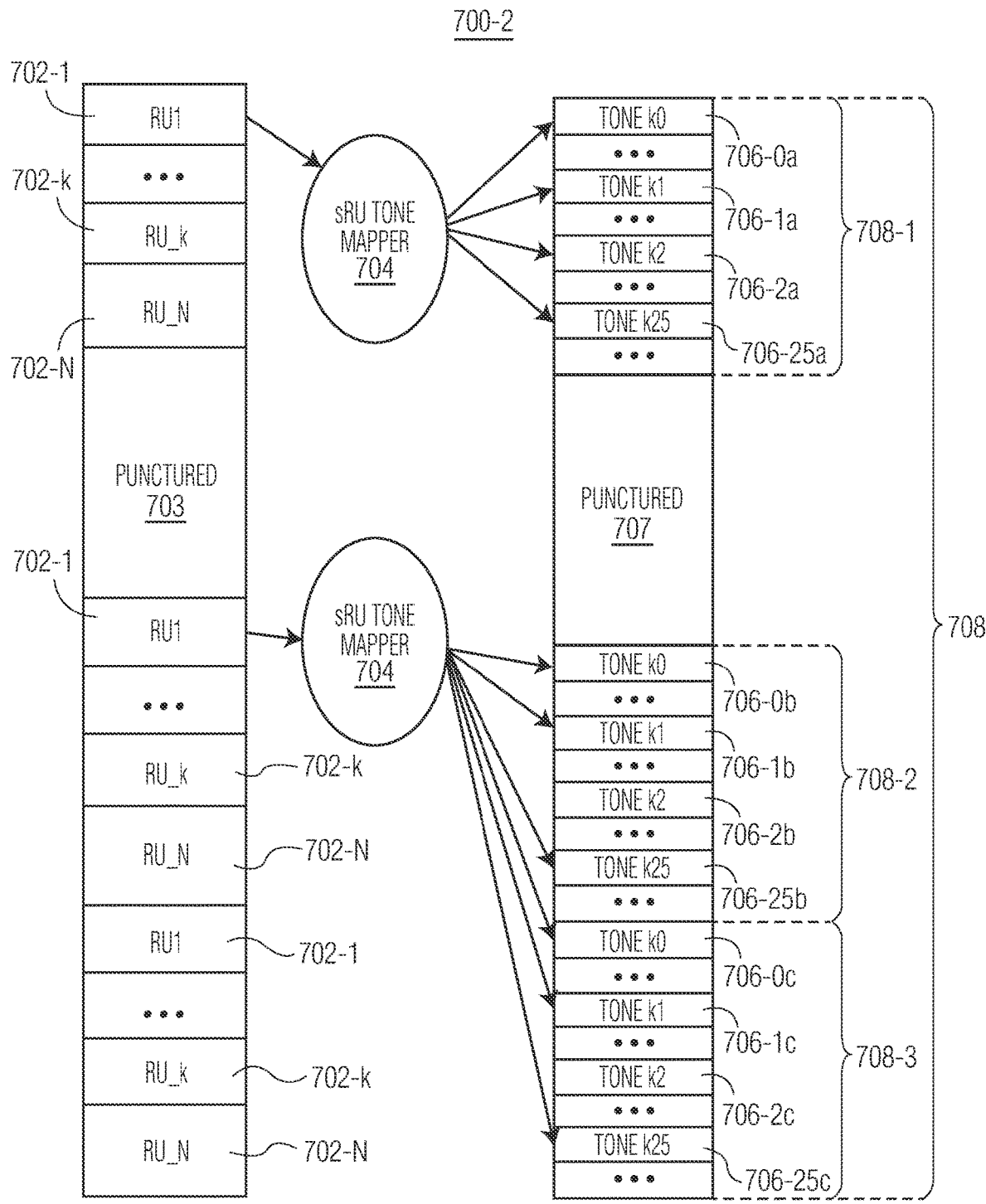
FIG. 7B illustrates another technique for distributing an RU across a signal bandwidth with a punctured subchannel.

FIG. 7B illustrates another technique, 700-2, for distributing an RU across a signal bandwidth with a punctured subchannel. The technique 700-2 includes the RUs 702-1, 702-k, and 702-N, the punctured segment 703, the sRU tone mapper 704, Tone k0 706-0a to Tone k25 706-25a, Tone k0 706-0b to Tone k25 706-25b, and Tone k0 706-0c to Tone k25 706-25c, the base modulation frequency units 708-1, 708-2, and 708-3, and the signal bandwidth 708 as described with reference to FIG. 7A.

In contrast to FIG. 7A, the technique 700-2 includes distributing RU1 702-1 over a predefined contiguous spreading bandwidth within the base modulation frequency units 708-1, 708-2, and 708-3. In an embodiment a first predefined contiguous spreading bandwidth includes the first base modulation frequency unit 708-1 and a second predefined contiguous spreading bandwidth includes the second and third base modulation frequency units 708-2, 708-3. In an embodiment, the signal bandwidth 708 of a PPDU is 80 MHz, the punctured subchannel 707 is 20 MHz, and the base modulation frequency units 708-1, 708-2, and 708-3 are 20 MHz. As such, the first predefined contiguous spreading bandwidth is 20 MHz, and the second predefined contiguous spreading bandwidth is 40 MHz.

Figure 8:
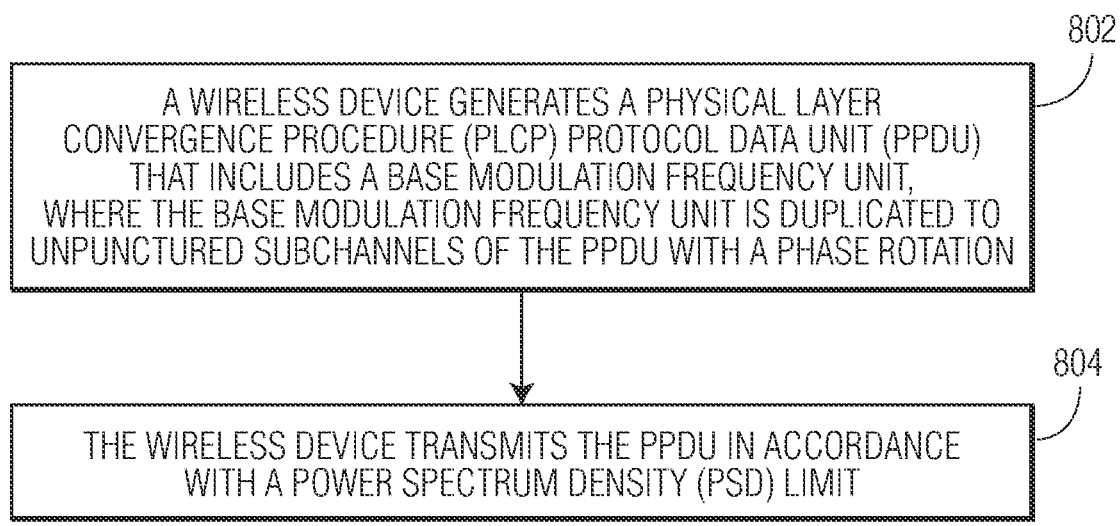
FIG. 8 illustrates a flow diagram of a technique for PSD limited transmissions in accordance with an embodiment of the invention.

FIG. 8 illustrates a flow diagram of a technique for PSD limited transmissions in accordance with an embodiment of the invention. At block 802, a wireless device generates a PPDU that includes a base modulation frequency unit, where the base modulation frequency unit is duplicated to unpunctured subchannels of the PPDU with a phase rotation. At block 804, the wireless device transmits the PPDU in accordance with a PSD limit.

In some embodiments, the technique for PSD limited transmissions may be implemented by a device (e.g., an AP of an AP MLD). For example, a device may include a wireless network interface device implemented on one or more ICs, where the wireless network interface device is configured to generate a PPDU that includes a base modulation frequency unit, where the base modulation frequency unit is duplicated to unpunctured subchannels of the PPDU with a phase rotation, and transmit the PPDU in accordance with a PSD limit.

In some embodiments, the technique for PSD limited transmissions may be implemented by a system. For example, a system includes a first wireless device, where the first wireless device includes a wireless network interface device implemented on one or more ICs, where the wireless network interface device is configured to generate a PPDU that includes a base modulation frequency unit, where the base modulation frequency unit is duplicated to unpunctured subchannels of the PPDU with a phase rotation, and transmit the PPDU in accordance with a PSD limit. In such an example, the system also includes a second wireless device, where the second wireless device includes another wireless network interface device implemented on one or more other ICs, where the other wireless network interface device is configured to receive the PPDU in accordance with the PSD limit.

Figure 9:
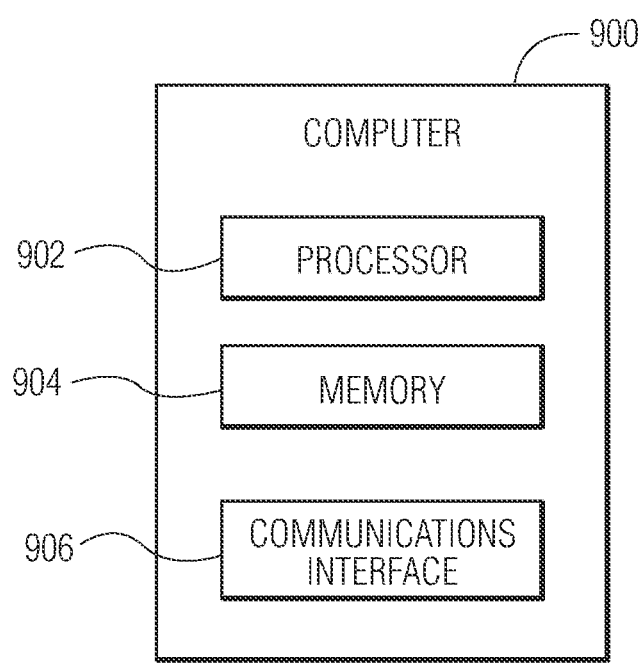
FIG. 9 depicts an example of a computer that can implement the technique for multi-link operations as described with reference to FIG. 8.

In an embodiment, the above-described functionality is performed at least in part by a computer or computers, which executes computer readable instructions. FIG. 9 depicts an example of a computer 900 that can implement the technique for PSD limited transmissions as described herein with reference to FIG. 8. As shown, the computer 900 includes a processor 902, a memory 904, and a communications interface 906. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 900 may represent a wireless device (e.g., an AP, an AP MLD, a non-AP STA, or a non-AP STA MLD). In such an example, the wireless device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
   a wireless network interface device implemented on one or more integrated circuits (ICs), wherein the wireless network interface device is configured to:
   generate a Physical Layer Convergence Procedure (PLCP) Protocol Data Unit (PPDU) that includes a base modulation frequency unit, wherein the base modulation frequency unit is duplicated to unpunctured subchannels of the PPDU with a phase rotation; and
   transmit the PPDU in accordance with a power spectrum density (PSD) limit.

2. The device of claim 1, wherein the PPDU is a non-orthogonal frequency-division multiple access (non-OFDMA) PPDU, and wherein:
   data is modulated on a basic bandwidth and duplicated across a signal bandwidth; and
   at least one of a per-basic bandwidth polarity change and a per-tone phase rotation is applied to the data.

3. The device of claim 1, wherein the phase rotation is defined by:

$$d'_{k+i*N_{SD}/2} = d'_k * e^{j\theta_{i,k}}$$

wherein d' represents modulated data, k represents a subcarrier of the base modulation frequency unit, i represents an index of the base modulation frequency unit, $N_{SD}$ represents a number of subcarriers included in the base modulation frequency unit, and j represents an imaginary unit that has a property of $j^2=-1$.

4. The device of claim 1, wherein the phase rotation is a per-unit phase rotation that uses one phase rotation defined for the base modulation frequency unit.

5. The device of claim 4, wherein the base modulation frequency unit is 20 megahertz (MHz), and the one phase rotation is a per-20 MHz phase rotation that uses a gamma rotation defined for a preamble portion of the PPDU.

6. The device of claim 1, wherein a signal bandwidth of the PPDU is 80 MHz with a punctured 20 MHz subchannel, and wherein the base modulation frequency unit and duplication scheme is at least one of:
   242 Resource Unit (RU) modulated via Modulation and Coding Scheme (MCS) 0 (MCS0) and tri-subcarrier modulation (TCM); and
   242 RU modulated via MCS0 and 484 RU modulated with dual-subcarrier modulation (DCM).

7. The device of claim 1, wherein a signal bandwidth of the PPDU is 80 MHz, and wherein the base modulation frequency unit and duplication scheme is at least one of:
   242 RU modulated via MCS0-DCM with four duplicates; and
   106 distributed RU (dRU) modulated via MCS0.

8. The device of claim 1, wherein a signal bandwidth of the PPDU is 160 MHz with at least one punctured 20 MHz subchannel, and wherein the base modulation frequency unit and duplication scheme is at least one of:
   242 RU modulated via MCS0 with N duplicates, wherein N=6 for a 120 MHz bandwidth and N=7 for a 140 MHz bandwidth;
   484+242 RU modulated via MCS0 with two duplicates for the 120 MHz bandwidth; and
   484 RU modulated via MCS0 with three duplicates for the 120 MHz bandwidth.

9. The device of claim 1, wherein a signal bandwidth of the PPDU is 160 MHz, and wherein the base modulation frequency unit and duplication scheme is at least one of:
   242 RU modulated via MCS0 with eight duplicates;
   484 RU modulated via MCS0-DCM with four duplicates;
   242 RU distributed over 160 MHz and modulated via MCS0; and
   242 RU distributed over 80 MHz and duplicated to another 80 MHz.

10. The device of claim 1, wherein a signal bandwidth of the PPDU is 320 MHz with at least one punctured 20 MHz subchannel, and wherein the base modulation frequency unit and duplication scheme is at least one of:
- 242 RU modulated via MCS0 with N duplicates, wherein N=10 for a 200 MHz bandwidth, N=12 for a 240 MHz bandwidth, and N=14 for a 280 MHz bandwidth;
- 484 RU modulated via MCS0 with N duplicates, wherein N=5 for the 200 MHz bandwidth, N=6 for the 240 MHz bandwidth, and N=7 for the 280 MHz bandwidth; and
- 996 RU modulated via MCS0 with three duplicates for the 240 MHz bandwidth.

11. The device of claim 1, wherein a signal bandwidth of the PPDU is 320 MHz, and wherein the base modulation frequency unit and duplication scheme is at least one of:
- 484 RU modulated via MCS0 with eight duplicates;
- 996 RU modulated via MCS0-DCM with four duplicates; and
- 484 RU distributed over 320 MHz and modulated via MCS0.

12. The device of claim 1, wherein the PPDU is transmitted via a punctured Extremely High Throughput (EHT) orthogonal frequency-division multiple access (OFDMA) transmission using dRU for extended range (ER); and
wherein an RU is distributed over a predefined punctured spreading bandwidth within the base modulation frequency unit.

13. The device of claim 1, wherein the PPDU is transmitted via a punctured EHT OFDMA transmission using dRU for ER; and
wherein an RU is distributed over a predefined contiguous spreading bandwidth within the base modulation frequency unit.

14. The device of claim 1, wherein the PPDU is transmitted via a punctured EHT OFDMA transmission using dRU for ER; and
wherein an RU is distributed over a predefined base spreading frequency unit.

15. The device of claim 1, wherein a 20 MHz EHT ER preamble is duplicated across unpunctured 20 MHz subchannels of the PPDU.

16. The device of claim 1, wherein the base modulation frequency unit of the PPDU is one eighth (⅛) of a signal bandwidth with eight duplicates.

17. The device of claim 1, wherein the base modulation frequency unit of the PPDU is one fourth (¼) of a signal bandwidth with DCM and with four duplicates.

18. The device of claim 1, wherein a dRU is spread within one eighth (⅛) of a PPDU bandwidth, and wherein the dRU is duplicated across the PPDU bandwidth.

19. A system comprising:
a first wireless device, wherein the first wireless device includes a wireless network interface device implemented on one or more integrated circuits (ICs), and wherein the wireless network interface device is configured to:
generate a Physical Layer Convergence Procedure (PLCP) Protocol Data Unit (PPDU) that includes a base modulation frequency unit, wherein the base modulation frequency unit is duplicated to unpunctured subchannels of the PPDU with a phase rotation;
transmit the PPDU in accordance with a power spectrum density (PSD) limit; and
a second wireless device, wherein the second wireless device includes another wireless network interface device implemented on one or more other ICs, and wherein the other wireless network interface device is configured to:
receive the PPDU in accordance with the PSD limit.

20. A method for power spectrum density (PSD) limited transmissions, the method comprising:
generating, by a wireless device, a Physical Layer Convergence Procedure (PLCP) Protocol Data Unit (PPDU) that includes a base modulation frequency unit, wherein the base modulation frequency unit is duplicated to unpunctured subchannels of the PPDU with a phase rotation; and
transmitting, by the wireless device, the PPDU in accordance with a PSD limit.

* * * * *